United States Patent Office 2,720,521
Patented Oct. 11, 1955

2,720,521

RECOVERY AND/OR PURIFICATION OF PROTO-VERATRINE FROM VERATRUM ALBUM

Robert M. Brooker, Indianapolis, Ind., assignor to Allied Laboratories, Inc., Kansas City, Mo., a corporation of Delaware No Drawing. Application November 7, 1952,
Serial No. 319,435

2 Claims. (Cl. 260—236)

This invention relates to the recovery of the alkaloid protoveratrine from *Veratrum album*. More particularly, it relates to a method for separating protoveratrine in a crystalline state and relatively free of other crystallizable alkaloids of *Veratrum album*.

Lyman C. Craig and Walter A. Jacobs [J. Biol. Chem., 143, 427 (1942)] describe a method for extracting protoveratrine and other crystallizable alkaloids from *Veratrum album*. In their process, the ground roots of *Veratrum album* are extracted with benzene made alkaline with ammonium hydroxide. The benzene solution of the alkaloids is then extracted with aqueous acetic acid. The acid extract is made alkaline and extracted with benzene. This benzene solution is evaporated to dryness, and the alkaloidal residue extracted with dry ether. The residue remaining after the ether extraction step constitutes the crude protoveratrine together with certain other low ether soluble alkaloids. By repeated crystallization from chloroform-ether mixtures, crystalline protoveratrine is obtained. Certain lots of *Veratrum album* when processed by the Craig and Jacobs procedure give satisfactory recovery of protoveratrine in a relatively pure form. In certain other cases, however, the protoveratrine is associated with substantial quantities of other low ether soluble alkaloids that are not readily freed therefrom. In order to produce uniform therapeutic effects, it is desirable that protoveratrine be made consistently available in a relatively pure crystalline form free from association with various other alkaloids of *Veratrum album*.

In accordance with the present invention, I have discovered that mixtures of alkaloids of *Veratrum album* having low ether solubility including protoveratrine can be treated with n-butyl chloride to effect a separation of pure protoveratrine from the other *Veratrum album* alkaloids having low ether solubility.

In carrying out my invention, the low ether soluble alkaloids obtained from *Veratrum album* in accordance with the procedure of Craig and Jacobs are utilized as my starting material. Certain lots of *Veratrum album* roots when processed in accordance with the Craig and Jacobs procedure result in the production of a mixture of low ether solubility alkaloids containing a considerable amount of protoveratrine. The mixture, however, effects the physical properties of protoveratrine in some manner that precludes its purification by crystallization from chloroform-ether. In my invention, these protoveratrine mixtures are extracted or leached with boiling n-butyl chloride. The protoveratrine is substantially insoluble in the hot n-butyl chloride; whereas, the other alkaloids having low ether solubility are completely soluble in the n-butyl chloride. The pure crystalline protoveratrine is thus obtained in good yields from its mixture with other *Veratrum album* alkaloids of low ether solubility.

It is an advantage of the present invention that a process is provided for the production of pure crystalline protoveratrine.

It is another advantage of the present invention that the use of my n-butyl chloride leaching procedure results in good yields of pure protoveratrine.

The manner in which my invention can be carried out is illustrated in the following examples:

Example I

One gram of a mixture of protoveratrine with other alkaloids of *Veratrum album* having low ether solubility, obtained by the method of Craig and Jacobs, was triturated with 10.5 ml. of n-butyl chloride while heating to boiling. The n-butyl chloride solution was allowed to cool slowly to room temperature and was filtered to obtain a yield of 205 mg. of pure crystalline protoveratrine.

Example II

One gram of a mixture of protoveratrine with other alkaloids of *Veratrum album* having low ether solubility, obtained by the method of Craig and Jacobs, was triturated with 18 cc. of n-butyl chloride while heating to boiling. The n-butyl chloride solution was allowed to cool slowly to room temperature and was filtered to obtain a yield of 135 mg. of pure crystalline protoveratrine.

Example III

Four grams of a mixture of protoveratrine with other alkaloids of *Veratrum album* having low ether solubility, obtained by the method of Craig and Jacobs, was triturated with 160 cc. of n-butyl chloride while heating to boiling. The n-butyl chloride solution was allowed to cool slowly to room temperature and was filtered to obtain a yield of 0.80 gm. of pure crystalline protoveratrine.

I claim:

1. In a method of separating protoveratrine from a mixture with other *Veratrum album* alkaloids of low ether solubility, said mixture being obtained by extracting ground *Veratrum album* roots with ammoniacal benzene, extracting the benzene solution with aqueous acetic acid, making the aqueous solution alkaline, then extracting with benzene and evaporating said benzene solution to dryness and the residue extracted with ether to give an ether insoluble alkaloidal residue, the improvement which comprises treating said mixture of such alkaloids with n-butyl chloride to effect a solution of all the alkaloids except protoveratrine and recovering the pure protoveratrine.

2. In a method of separating protoveratrine from a mixture with other *Veratrum album* alkaloids of low ether solubility, said mixture being obtained by extracting ground *Veratrum album* roots with ammoniacal benzene, extracting the benzene solution with aqueous acetic acid, making the aqueous solution alkaline, then extracting with benzene and evaporating said benzene solution to dryness and the residue extracted with ether to give an ether insoluble alkaloidal residue, the improvement which comprises treating said mixture of such alkaloids with hot n-butyl chloride to effect a solution of all the alkaloids except protoveratrine and recovering the pure protoveratrine.

References Cited in the file of this patent

Craig and Jacobs: 143, 427–432 (1942).
Bredeman: Chem. Zentralblat, 1906, 608.